United States Patent

[11] 3,538,942

| [72] | Inventors | Charles E. Lyall<br>Deerfield;<br>Edwin A. Morrison, Highland Park; Robert<br>B. Vesely, Lombard, Illinois |
|---|---|---|
| [21] | Appl. No. | 778,871 |
| [22] | Filed | June 19, 1968<br>Division of Ser. No. 258,204, Feb. 13, 1963,<br>now Patent No. 3,441,047. |
| [45] | Patented | Nov. 10, 1970 |
| [73] | Assignee | Culligan Inc.,<br>Northbrook, Illinois<br>a corporation of Delaware |

[54] CONTROL VALVE AND CARTRIDGE UNIT
11 Claims, 8 Drawing Figs.

[52] U.S. Cl. ................................................. 137/454.6,
137/625.62, 137/625.66, 251/25, 137/630.19
[51] Int. Cl. .................................................. F16k 31/48
[50] Field of Search ........................................ 137/454.6,
620.19, 299

[56] References Cited
UNITED STATES PATENTS
2,754,840  7/1956  Hicks ........................... 137/454.6

| 2,826,214 | 3/1958 | Volker ........................ | 137/454.6 |
| 2,826,215 | 3/1958 | Wolfslau ..................... | 137/454.6 |
| 3,095,176 | 6/1963 | Hunt ........................... | 137/454.6X |
| 3,146,788 | 9/1964 | Mahlstedt ..................... | 137/399 |

*Primary Examiner*—Harold W. Weakley
*Attorney*—Wilson and Geppert

ABSTRACT: A directional control valve for a water conditioner or the like including a valve housing having an inlet, an outer and a central chamber, a cartridge unit adapted to be inserted in the central chamber and having a shoulder cooperating with a shoulder in the housing and a lower surface cooperating with a second spaced shoulder, and a cap closing the upper end of the housing and retaining the cartridge unit therein. The cartridge unit includes spaced upper and lower diaphragms clamped therein, with the cap clamping the upper diaphragm and forming a pressure chamber thereabove, and a two-part reciprocable valve unit actuated by the diaphragms to control liquid flow in the valve housing and valve cartridge. The valve housing and cartridge also provide for a drain chamber and a bypass chamber, and a diaphragm-actuated pilot valve controls liquid flow to the pressure chamber in the cap.

Inventors
Charles E. Lyall
Edwin A. Morrison
Robert B. Vesely
by Wilson & Sepper
Atty's Patented Nov. 10, 1970
3,538,942
Sheet 2 of 3
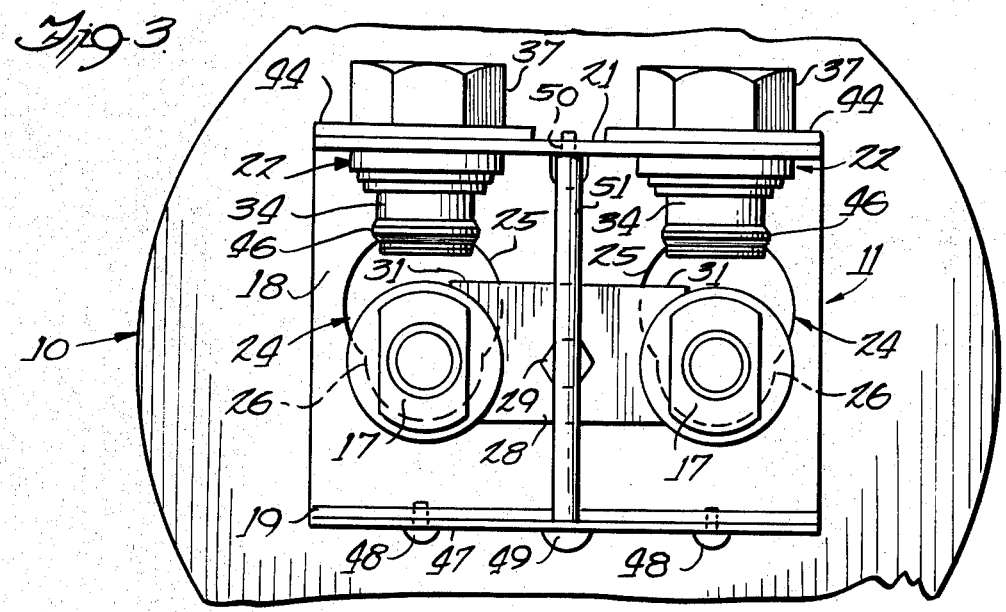
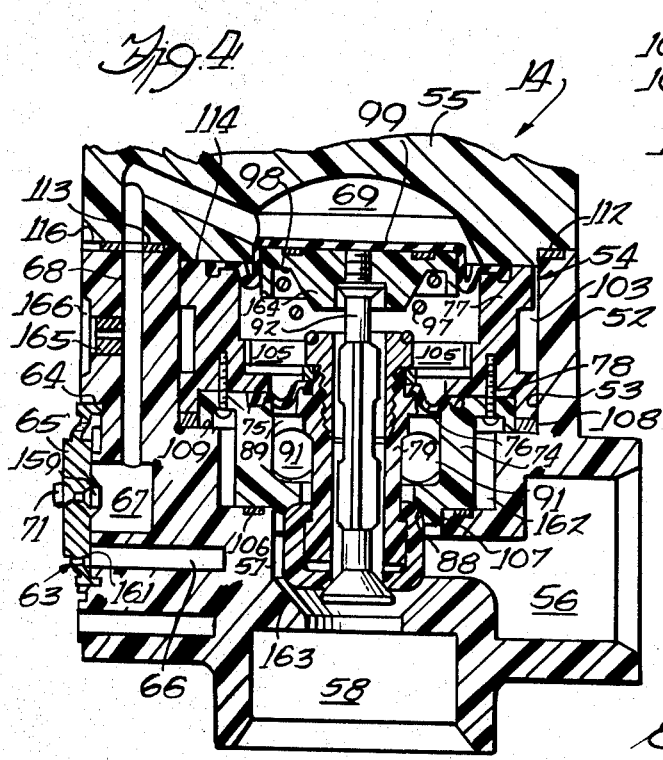
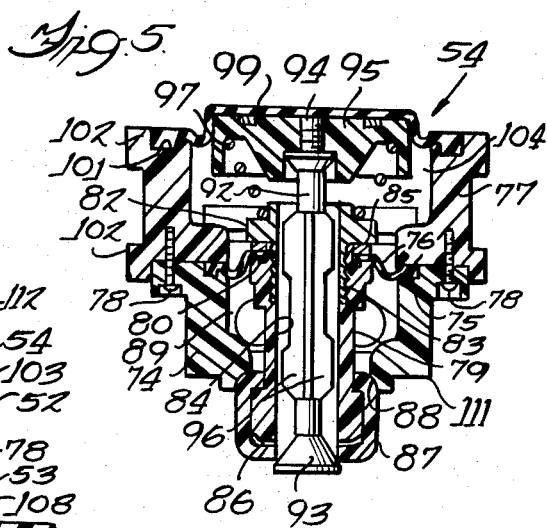
Inventors
Charles E. Lyall
Edwin A. Morrison
Robert B. Vesely
by Wilson & Geppert
Atty's

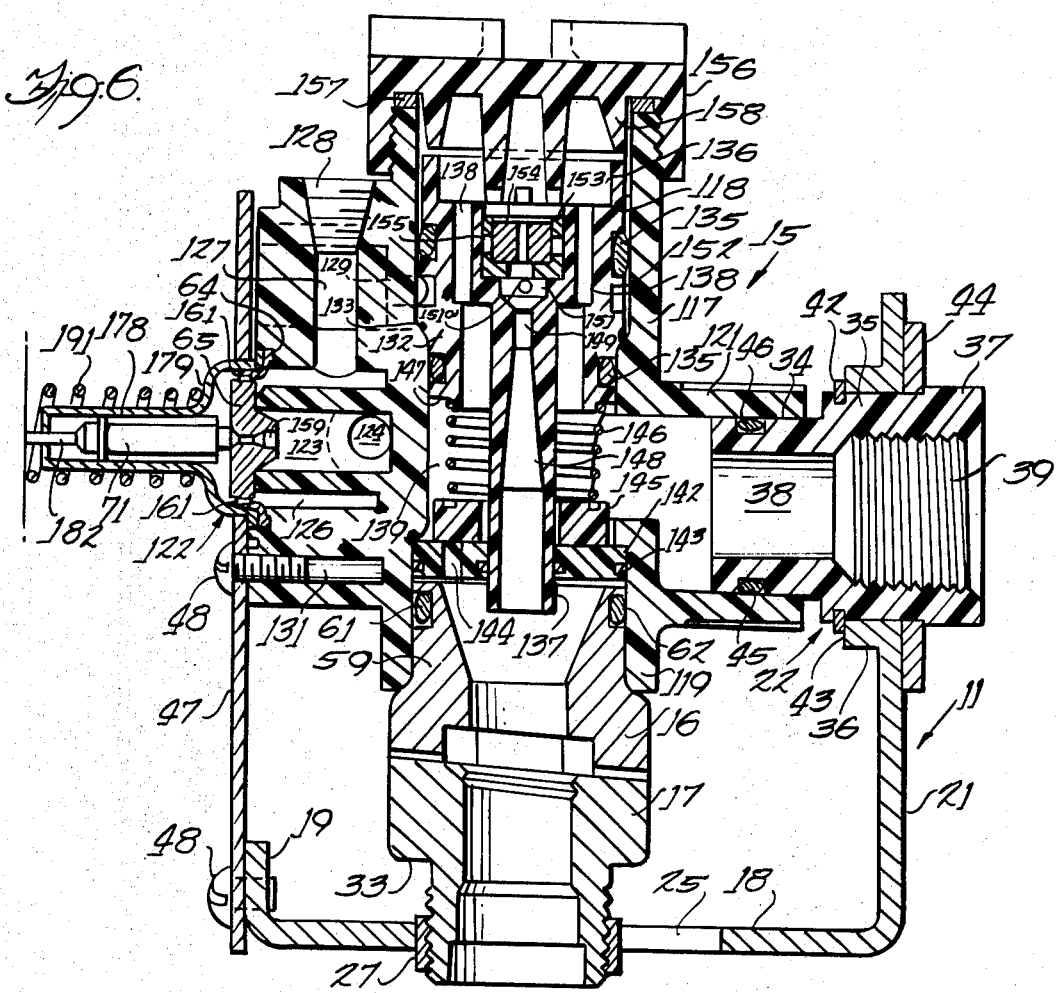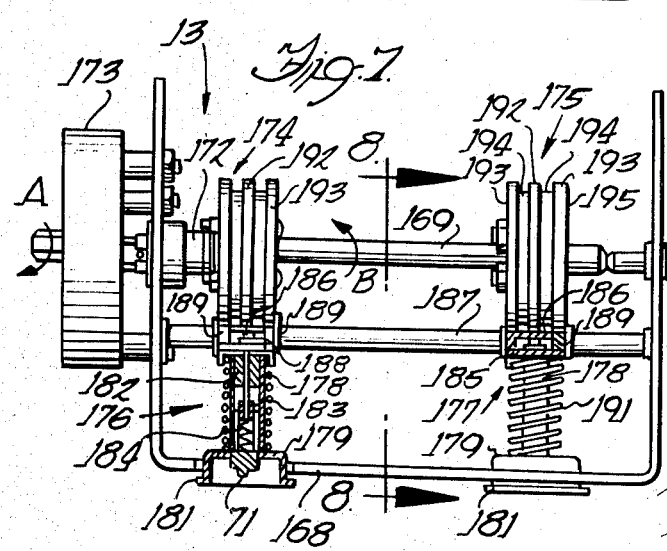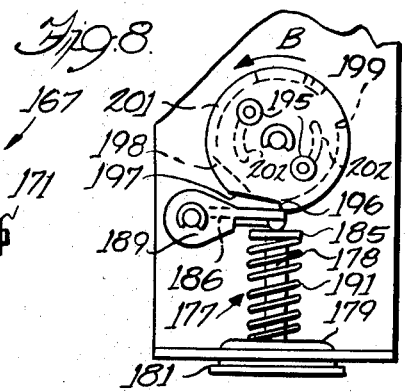

CONTROL VALVE AND CARTRIDGE UNIT

The present invention relates to an improved hydraulically operated two-position control valve assembly, and more particularly to a novel cartridge construction for the valve members in the assembly.

In the Schulze et al. U.S. Pat. No. 3,006,376, entitled "Automatic Control Valve for Water Softeners or Conditioners," a hydraulically actuated two-stage control valve is disclosed involving a flow-directing valve which is actuated by a pair of spaced diaphragms operating a two-part reciprocable valve assembly and a separate eductor unit, with a timer unit actuating the flow-directing valve. However, if the valve required servicing, considerable time and expense was necessarily consumed in removing the valve from the plumbing connections and the tank and in the disassembly of the flow-directing valve unit.

Also, if a time control brine refill valve unit, such as shown in the Mahlstedt et al. U.S. Pat. application Ser. No. 136,556, now U.S. Pat. No. 3,146,788 were utilized, provision would need be made for a second timer unit and for the addition of the refill valve assembly to the control valve of the above cited Schulze et al. patent. The present invention comprehends a novel valve, valve mounting and timer assembly which obviates these and other involved problems and simplifies the construction and servicing of these valves.

An important object of the present invention is the provision of a valve assembly for a two-step control valve wherein the internal mechanism of the valve is provided in a unitary cartridge adapted to be inserted into the valve body. In this way, a maximum of serviceability can be achieved with a minimum of disassembly of the valve itself and without disconnection of the control valve from the plumbing.

Another object of the present invention is the provision of a valve assembly utilizing components of suitable plastic construction. In both the control valve and the eductor unit, substantially all of the valve elements and the housings are formed of plastics which will withstand the pressures created in the valve and provide for lightweight and inexpensive repair or replacement. By utilizing a cartridge construction of the internal mechanism of the valve, the main structural valve housing acts mainly as a pressure vessel and becomes a fluid bearer between the above-mentioned cartridge and the atmosphere.

Further objects are to provide a construction of maximum simplicity, efficiency, economy and ease of assembly and operation, and such further objects, advantages and capabilities as will later more fully appear and are inherently possessed thereby.

In the drawings:

FIG. 3 is a top plan view of the mounting bracket secured to the water-conditioning tank, but with the valve assembly and timer removed.

FIG. 4 is a vertical cross-sectional view of the control valve assembly of the present invention showing the valve components in their normal operating positions.

FIG. 5 is a vertical cross-sectional view of the cartridge unit containing the operating mechanism of the flow-directing valve and showing the unitary construction thereof.

FIG. 6 is an enlarged view in vertical cross section taken on the line 6-6 of FIG. 1 showing the internal structure of the eductor unit, the connectors to the tank and the plumbing connected on the mounting bracket.

FIG. 7 is a front elevational view partially in cross section through the timer mechanism and showing the cam mechanism and the associated pilot valve stems for operating the pilot valves of the valve assembly.

FIG. 8 is a vertical cross-sectional view on the line 8-8 of FIG. 7 and further showing the construction of the cams and cam followers.

Figure 1:
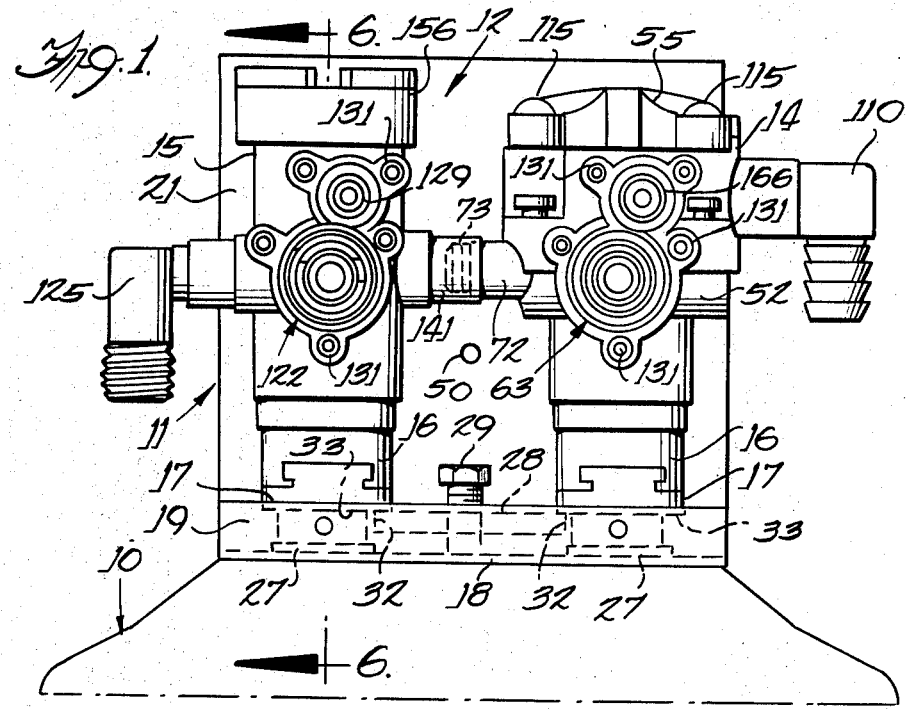
FIG. 1 is a front elevational view with the pilot valve plate removed showing the novel control valve assembly mounted on a water-conditioning tank by a mounting bracket secured to the tank.
Figure 2:
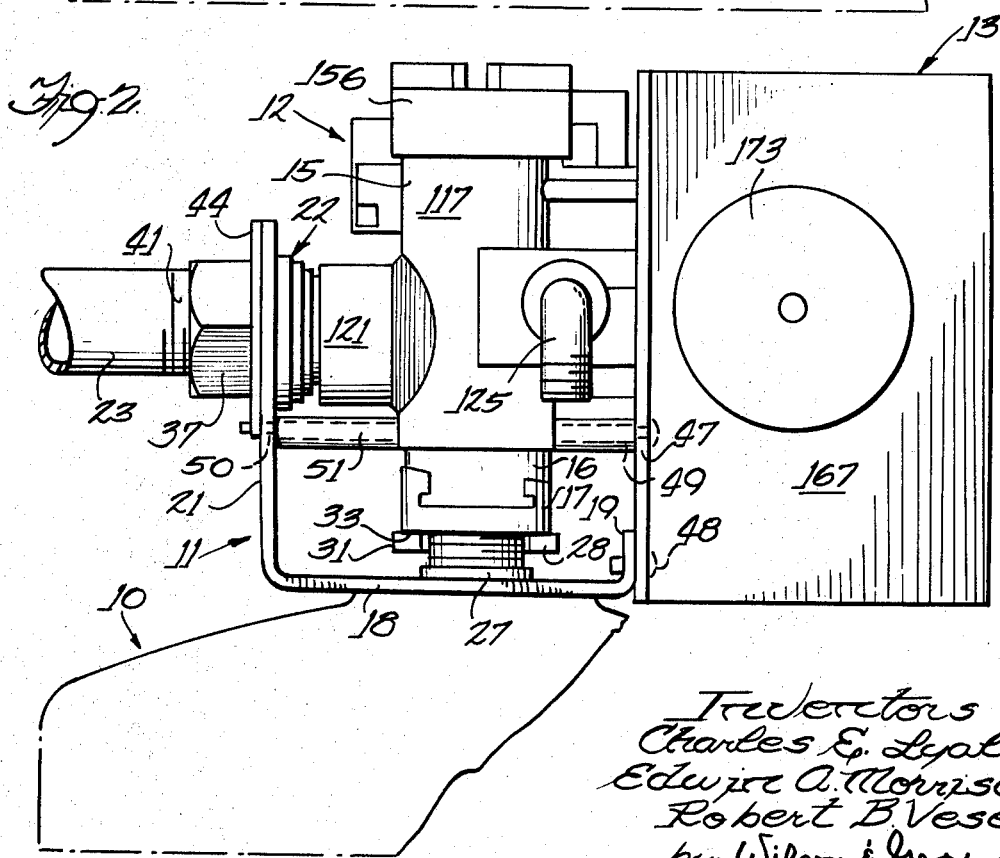
FIG. 2 is a side elevational view of FIG. 1 and further showing the details of the mounting bracket, the pilot valve plate, and the mounting of the valve assembly and the timer mechanism.

Referring more particularly to the disclosure in the drawings which illustrate a preferred embodiment of the present invention, FIGS. 1 and 2 disclose a water-conditioning tank 10 having a mounting bracket 11 removably secured thereto for the support of a control valve assembly 12 and a timer assembly 13. The control valve assembly 12 includes a directional control valve 14 and an eductor unit 15 which are mounted on the tank 10 by suitable slip connectors 16 and 17 on the valve assembly 12 and the tank, respectively.

The mounting bracket 11, which is secured to the tank, has a base 18 with an upstanding lip 19 at the front of the bracket and an upstanding wall or plate 21 at the rear thereof. The plate 21 supports connectors 22 adapted to be attached to the plumbing lines 23 leading to service in the home or other installation. The base 18 has two spaced key slots 24 having an enlarged portion 25 which will fit over a slip connector 17 and a narrowed portion 26 (FIG. 3) which accommodates the internally threaded tank bosses 27 defining the inlet and outlet openings into which the fittings 17 are threadedly engaged (FIG. 6). A clamping plate 28 having a centrally located internally threaded opening for a bolt 29 is mounted between the fittings 17,17 so that the shoulders 31 on the plate abut the fittings. The bolt 29 is then turned to lift the plate 28 upward with the end of the bolt engaging the base 18 of the bracket 11 until the outer ends 32 of the plate engage the undersurfaces 33 of the enlarged portions of the fittings 17,17 to clamp the bracket onto the tank 10.

The connectors 22, as best seen in FIGS. 3 and 6, are generally cylindrical each having a stepped down male portion 34 adapted to sealingly fit within a cylindrical port in the valve assembly 12, an intermediate portion 35 rotatably mounted in an extruded opening 36 in the wall 21 and terminating beyond the bracket in a hexagonal portion 37 for ease of rotation. A cylindrical passage 38 extends from the male portion 34 approximately halfway through the connector which then enlarges into an internally threaded passage 39 which conformably receives the externally threaded end 41 of a pipe 23 of the plumbing for the home or other installation. This bracket design will also accommodate other suitable fittings such as sweat fittings or manual control valves having spaced ports such as shown in the Tice U.S. Pat. No. 2,684,942.

A split ring 42 is received in an annular channel or slot adjacent the edge 43 of the opening 36 to hold each connector from longitudinal movement and a plate or ring 44 on the exterior of and abutting the bracket 11 has an opening receiving the intermediate portion 35 of each connector, but preventing longitudinal movement toward the valve assembly due to the enlarged hexagonal portion 37. An annular channel 45 adjacent the end of the male portion 34 contains a sealing ring 46 to provide a slip connection with an effective fluid seal when water pressure is present. Although the extruded opening 36 in the wall 21 and the plates or rings 44 are shown in the drawings, these are not essential to the invention, as the rings 44 can be eliminated with the use of an opening cut in the wall 21.

A pilot valve diaphragm plate 47 is secured to the upstanding lip 19 of the bracket 11 and to the valve assembly by suitably securing means 48 in a vertical position and parallel to the plate 21 of the bracket. A third contact between the bracket and the pilot valve diaphragm plate 47 is made through a single bolt 49 having a spacing sleeve 51 thereon; said bolt passing through the plate 47 and threadedly engaging a threaded opening 50 in the wall or plate 21. This bolt 49 is suitably positioned to absorb the force of the moment arm developed by the water pressure at the connectors 22 and the valve assembly 12 which tends to force the bracket 11 and plate 47 apart. Further, the plastic components of the valve assembly 12 are sandwiched between rigid structural members (the plate 21 of the bracket 11 and the plate 47) and are not required to absorb stresses and strains other than those of an isolated pressure vessel.

Both the directional control valve 14 and the eductor unit 15 have a cartridge-type construction for the internal operating mechanism to provide convenience of assembly and disassembly and allow substitution of cartridges so as to prevent unnecessary delays in the water-conditioning operation. With respect to the directional control valve 14, this valve includes a hollow valve body 52 having a centrally located stepped hollow chamber 53 for the valve cartridge 54 and a diaphragm cap 55 closes the upper end of the chamber. A rearwardly extending main inlet port 56 is adapted to conformably receive the male portion 34 of a connector 22 for water entering from the pipe or line 23 and communicates with a chamber 57 which is an extension of the chamber 53. This chamber 57 communicates with an outlet port 58 therebelow which conformably receives the upper reduced portion 59 of a slip fitting or connector 16 (see FIG. 6). A resilient O-ring 61 is positioned in an annular groove 62 in the portion 59 to seal the fitting within the port 58.

A pilot valve fitting 63 has an annular seat 64 for the periphery of a circular diaphragm 65 controlling flow from the generally annular inlet slot 66, communicating with a source of liquid pressure to be described later, to a central chamber 67 which communicates through a passage 68 to a domed pressure chamber 69 formed in the diaphragm cap 55. The pilot diaphragm 65 is controlled through a valve stem 71 in a manner to be described later. A bypass fitting 72 extending from the body 52 having a sealing ring 73 adjacent its outer end contains a bypass passage communicating with the central chamber 53.

The cartridge 54 includes a lower housing or seat ring 74 having an annular groove 75 in the top of the seat ring 74 to receive the outer peripheral edge of a lower diaphragm 76. An upper housing or ring diaphragm retainer 77 engages the seat ring 74 to clamp the edge of the diaphragm 76 in a pressure-tight seal with the seat ring and retainer being held together by self-tapping screws or other suitable means 78. Both the seat ring 74 and the ring diaphragm retainer 77 are formed of a suitable plastic material as is the valve housing 52 and the diaphragm cap 55. An example of this plastic material is an acetal resin such as polyoxymethylene, although it is not our intent to be limited by this example.

A plunger body 79, also formed of plastic, has an annular groove 80 at its upper end to receive the inner edge of the diaphragm 76 which is held in place by a plastic slip ring 81 and a metal retaining nut 82 which has an externally threaded downwardly extending sleeve 83 engaging the internally threaded wall of a central passage 84 in the plunger body 79. The nut 82 is tightened until bottoming on its hexagonal shaped shoulder 85 to create a predetermined pressure-tight seal. The plunger body has an enlarged lower end 86 which extends below the seat ring 74 and is covered with a resilient plunger seal to form an enlarged valve member 87. The seat ring 74 has a conical or tapered valve seat 88 formed adjacent to the bypass chamber 89 in the seat ring 74 below the diaphragm 76 to receive the valve member 87 in its normal position. Suitable openings 91 in the seat ring extend radially to the exterior thereof.

The drain valve stem 92 of a suitable plastic is inserted in the plunger body 78 so that the conical valve 93 seats upon the resilient plunger seal of the enlarged valve member 87. The stem 92 has a threaded upper end 94 which is threadedly engaged with a diaphragm support 95, and the stem is formed intermediate the ends with equally spaced radially extending fins 96 acting to guide the stem in its reciprocable movement. A helical compression spring 97 has one end seated in an annular depression or groove 98 formed in the underside of the diaphragm support 95 and the opposite end abuts the top of the retaining nut 82.

An upper diaphragm 99 is positioned to rest on the diaphragm support 95 and its enlarged peripheral edge is received in an annular groove 101 on the top of the ring diaphragm retainer 77. The retainer has a pair of spaced radial flanges 102 (FIG. 5) which form an annular chamber 103 (FIG. 4) therebetween communicating with a drain chamber 104 between the two diaphragms 76 and 99 through the openings 105 in the side of retainer 77.

The above assembly as one integral unit becomes the cartridge 54 and it is installed in the valve housing 52 as follows: a resilient lower seal 106 is positioned in a retaining groove in the shoulder 107 and a second resilient seal 108 is positioned on the shoulder 109 of the valve housing 52. The cartridge 54 is then dropped into the chamber 53 with the lower surface 111 of the seat ring 74 contacting the lower seal ring 106 and the lower flange 102 on the ring diaphragm retainer 77 contacting the sealing ring 108. The upper diaphragm 99 is located over the support 95 with the outer seal ring or edge in the groove 101 and a resilient cap ring seal 112 is positioned in a groove in the upper edge of the housing 52. The seal 112 has a circular portion 113 for sealing the passage 68 at the junction of the cap 55 and housing 52.

To further define the sealing members in the valve housing, leakage prevention between the various chambers is accomplished as follows: The lower seal 106 assures against hard water bypass leakage to the annular chamber 162 while the valve 14 is in the service position. The upper seal 108 prevents leakage of either soft water while the valve is in the service position, or hard water to the drain cavity 103 or chamber 104 while the valve is in the regeneration position. The top cap seal 112 provides a seal between the drain valve cavity 103 and the atmosphere. However, an additional portion of this gasket provides a seal between the chamber 69 above the upper diaphragm 99 and the atmosphere. The peripheral head on the upper diaphragm 99 provides a seal between the upper diaphragm or pressure chamber 69 and the drain chamber 104.

When the diaphragm cap 55 is assembled on the housing, its shoulder 114 engages the outer edge or bead of the diaphragm 99 to provide a compression seal thereat. Suitable fastening means 115 are utilized to attach the cap 55 to the housing 52 and as the fastening means are tightened, the downward pressure compresses the lower seal 106 and the upper seal 108 until the flange portion 116 meets with the cap seal 112 and then all four seals are compressed until a predetermined compression has been established by the bottoming of the diaphragm cap against the valve housing.

The eductor unit 15 is generally similar in construction to that shown in the Schulze et al. U.S. Pat. No. 3,006,376 except that it is substantially all formed of a suitable plastic material rather than metal. This unit as shown in FIG. 6 includes a body member 117 having a central chamber 118 extending vertically therethrough; the lower end of the chamber forming an outlet port 119 adapted to conformably receive the upper reduced end 59 of a slip fitting 16. This fitting is identical with the fitting for the directional valve assembly 14 previously described. A service outlet port 121 communicating with the chamber 118 extends rearwardly of the body 117 and conformably receives the male portion 34 of the connector 22 communicating with the pipe 23 leading to service in the home or other installation.

Opposite the service outlet port is a pilot valve fitting 122 having a diaphragm 65 activated by a valve stem 71. The central chamber 123 communicates with a laterally extending passage 124 which communicates with a fitting 125 (see FIGS. 1 and 2) adapted to be connected to a conduit leading to a brine storage tank. The lateral passage contains a reciprocable resilient flow control (not shown) which allows unlimited flow the eductor and a limited flow to the brine tank. This flow control, pilot valve and brine tank have been more specifically disclosed in the copending Mahlatedt et al. U.S. Pat. application Ser. No. 136,556, now U.S. Pat. No. 3,146,788, entitled "Time Control Brine Refill System."

The outer annular chamber 126 of the fitting 122 communicates with a vertical passage 127 extending through the fitting, but plugged at its upper end with a suitable member 128. The passage 127 communicates with a laterally removed passage 129 (FIG. 1) entering the body member 117. As shown in FIG. 6, the plate 47 is secured to the body member through holes 131 (FIG. 1) so that the plate 47 having suitable sealing means seals the open end of the passage 129 and sealingly compresses the diaphragm 65 into the annular groove 64. The passage 129 communicates with the eductor throat as later described.

Within the body is an eductor housing 132 which is conformably received in the chamber 118 with a tapered shoulder 133 on the housing abutting a complementary tapered shoulder in the body. Resilient rings 135 are located in annular channels in the eductor housing 132 above and below the shoulder 133 to seal the housing in the body member 117 and prevent leakage. The housing terminates at its upper end in a recess 136, and a depending tubular part 137 extends from the lower end thereof. Passages 138 offset from the longitudinal axis of the housing communicate between a central chamber 139 and the recess 136. The chamber 139 communicates with the service outlet port 121 and with a bypass fitting 141 extending from the body 117 which sealingly receives the bypass fitting 72 of the valve body 52 therein (see FIG. 1).

Surrounding the depending tubular part 137 below the chamber 139 in a spider member 142 having inner and outer O-rings 143 in sealing engagement with the body 117 and the part 137. The spider contains a plurality of equally spaced openings 144 to provide communication between the port 119 and the chamber 139. A check valve 145 surrounds the part 137 above the spider member 142 and is normally urged against the spider member to close the openings 144 by a compression spring 146 having one end abutting the check valve and the opposite end engaging the lower edge 147 of the eductor housing 132.

A central passage 148 extends through the eductor housing 132 and depending part 137 to open into the central passage of the fitting 16. A constriction or throat 149 is located below an enlarged portion 151 of the passage having an opening 151$^a$ communicating with the annular chamber 152 surrounding the housing and communicating with the passage 129 from the pilot valve fitting 122. Above the enlarged portion 151 is a further enlarged bore of the passage receiving a cup-shaped housing 153 for a resilient flow control 154. This flow control communicates with the recess 136, and an O-ring 155 seals the cup-shaped housing 153 in the enlarged bore.

An internally threaded cap 156 engages the external threads at the top of the eductor body 117 to close the upper end of the chamber 118; a sealing ring 157 being clamped between the cap and the body. The cap includes an annular depending flange 158 which contacts the upper edge of the housing 132 to properly position and retain the housing in the body. The cap 156 has a recess to allow flow of liquid from the passages 138 to the flow control 154 and the passage 148.

The installation and operation of this control valve assembly 12 as seen in FIG. 1 is as follows: utilizing a tank 10 which has been properly prepared with respect to the ion exchange mineral, bed depth, leak test and sterility, the bracket 11 is placed on the tank over the slip fittings 17. The bracket is then slid to the rear until the tank bosses 27 are properly located in the narrowed portions 26 of the key slots 24 and the clamping plate 28 is positioned with its shoulders 31 abutting the fittings 17. The bolt 29 is then driven downward engaging a suitable depression in the bracket so that the ends 32 of the clamping plate 28 abut the under surface 33 of the fittings 17 to clamp the bracket onto the tank 10. Through the use of the swivel connectors 22, the tank and bracket are secured to the plumbing lines 23 for the service installation.

The eductor unit 15 and control valve 14 are then joined together through the slip bypass fittings 72 and 141 and this assembly is placed on the tank so that the female slip connectors 16 meet the male slip connectors 17 on the tank. The valve assembly is then moved to the rear until the male portions 34 of the connectors 22 mate with female fittings 56 and 121 of the control valve and eductor unit, respectively. Then the pilot valve plate 47, fitting over and engaging pilot valve fittings 63 and 122, is secured to the lip 19 of the bracket by securing means 48 which threadedly engage the lip. Also the long bolt 49 (FIG. 3) is passed through the plate 47 and the sleeve 51 and secured to the plate 21 of the bracket 11 to provide a rigid structure. The timer assembly 13 for actuating the valve stems 71 is secured to the plate 47 and the tank and valve assembly are now ready to provide an automatic service unit.

During normal service operation, the control valve 14 is positioned as shown in FIG. 4 with hard water from the pipe 23 passing through the connector 22 and entering the valve 14 through the inlet port 56. The water enters the chamber 57 and passes downward through the fittings 16 and 17 into the tank 10 and downward through the ion exchange or other treating material. The treated water passes up through the other spaced fittings 17 and 16 and the openings 144 in the spider member 142 lifting the check valve 145 so that the softened water enters the chamber 139 and exits through the service outlet fitting 121 to the pipe 23. Liquid pressure also forces water through the bypass fittings 141, 72 to enter the bypass chamber 89 via the openings 91 to exert upward pressure on the lower diaphragm 76 to retain the plunger 79 and drain valve stem 92 in their upper positions. Also, the annular chamber 162 communicates with the annular chamber 66 in the pilot valve 63 through a suitable passage in the valve body 52.

Both pilot valves are retained closed during the service cycle except that the valve stem 71 in the fitting 122 of the eductor unit 15 is actuated by the timer assembly 13 for a predetermined interval of time to allow a predetermined quantity of water (based on the time interval and a known flow rate) to enter the brine tank to produce sufficient brine for the next regeneration cycle. Water from the tank 10 passes up through the passage 148 into the portion 151 and then through opening 151$^a$ to the annular chamber 152 and through the passages 129 and 127 to the annular chamber 126. When the timer retracts the valve stem 71 to uncover the central opening 159 in the pilot diaphragm 65, flow of water is allowed to pass through the bleed holes 161 in the diaphragm and out the opening 159 into the chamber 123. As the pressure drop at the bleed holes 161 is greater than that at the opening 159, a reduced pressure is created above the diaphragm 65 to lift it off of its seat and allow flow from the annular chamber 126 directly to the chamber 123 and thence through a flow control in the passage 124 and through fitting 125 to the brine tank.

When the water-conditioning material is exhausted and requires regeneration, the timer assembly 13 actuates the pilot valve at the fitting 63 to lift the valve stem 71 away from the diaphragm 65 and the diaphragm is lifted in the same manner as previously described for the fitting 122, the pilot valve for fitting 122 being closed. Water from the bypass fittings 141 and 72 to the annular chamber 162 passes through the passage (not shown) to the annular chamber 66, chamber 67 and passage 68 to the pressure chamber 69 to urge the diaphragm 99 downward. The diaphragm 99 simultaneously moves the support 95, drain valve stem 92 and the plunger body 79 downward until the enlarged valve member 87 seats on a valve seat 163 in the valve body 52 defining the lower end of the chamber 57 and then the drain valve stem 92 is moved downward relative to the plunger body 79 until the support 95 contacts the retainer ring 82 through the support fins 164 (FIG. 4).

Water flow through the valve from the inlet 56 is now diverted into the bypass chamber 89 as long as continued pressure exerted into the pressure chamber 69 retains the diaphragm 99 in its lower position. Flow also exits from the bypass chamber 89 through openings 91 and annular chamber 162 and through the bypass fittings 72 and 141 to the chamber 139 in the eductor unit 15. As the water pressure urges the check valve 145 onto the spider member 142, flow can only occur out through the service outlet fitting 121 or up through the passages 138 in the eductor housing 132. Water moving upward through the passages 138 into the recess 136 then moves downward through the flow control 154, enlarged portion 151, throat or constriction 149 and the passage 148 in the depending tubular part 137 to enter the tank 10 through the fittings 16 and 17.

Liquid flow through the constriction 149 creates a reduced pressure in the enlarged portion 151, opening 151ᵃ, annular chamber 152 and passages 129 and 127 communicating with the annular chamber 126 of the pilot valve fitting 122. The suction lifts the diaphragm 65 in the fitting 122 to allow flow of brine from the brine tank under vacuum to the fitting 125 and into the passage 124. As more fully disclosed in the above-mentioned Mahlstedt et al. U.S. Pat. application Ser. No. 136,556, now U.S. Pat. No. 3,146,788, the reciprocable flow control in the passage 124 allows substantially unrestricted flow from the brine tank to the eductor unit 15. The brine passes through the pilot valve fitting 122, passages 127 and 129, annular chamber 152, opening 151ᵃ and into the chamber 151 to mix with the water flowing through the passage 148 and provide dilute brine for the regeneration of the material in the tank by upflow regeneration.

The effluent exits from the tank through fittings 16 and 17 into the outlet fitting 58 of the control valve assembly 14. This effluent passes up through the passage formed between the plunger body 79 and the drain valve stem 92 into the drain chamber 104 and then through the openings 105 to the annular chamber 103 and out through an opening (not shown) to the drain fitting 110 (FIG. 1).

When the brine is exhausted, the conduit from the brine tank is closed by a suitable air check valve, and water continues to flow through the passage 148 into the tank to rinse the material, and when the rinsing step is completed, the valve stem 71 seats on the diaphragm 65 in the fitting 63 of the control valve assembly 14 with the pressure above the diaphragm increasing until the diaphragm seats to cut off flow through the pilot valve fitting 63. When the pilot valve is closed, the pressure below the lower diaphragm 76 in chamber 89 tends to urge the plunger body 79 upward and the pressure in the chamber 69 decreases as the water therein is bled through a flow control 165 in a drain passage 166 leading from the passage 68 in the valve body 52 to drain. As the water is bled from the chamber 69, the drain valve stem 92 moves upward to close the passage in the plunger body 79 and both the plunger body and the drain valve stem move upward to seat the enlarged valve 87 on the valve seat 88 shutting off flow to the bypass chamber 89.

The control valve assembly has now returned to the position for service operation, and shortly after the service cycle has started, the valve stem 71 of the pilot valve fitting 122, which was not actuated during the regeneration operation, is actuated to lift the pilot diaphragm 65 and allow a predetermined quantity of water to enter the brine tank to provide concentrated brine for the next regeneration cycle.

The timer assembly for the present invention must provide both for the actuation of the control valve 14 and actuation of the timed brine refill system contained in the eductor unit 15. FIGS. 7 and 8 disclose a novel timer assembly suitable for use with the pilot valves of the control valve assembly 12. This timer assembly 13 includes a mounting bracket 167 which is secured at its base 168 to the pilot diaphragm valve plate 47 or this bracket could be substituted for the plate 47 and secured directly to the lip 19 and the control valve assembly 12 through the securing means 48.

A cam shaft 169 extends through and is rotatably mounted at one end in the bearing 171 in the bracket 167, and the opposite end of the shaft is attached to a spring clutch 172. The shaft is driven by a spring-wound motor 173. The spring clutch 172 is utilized to prevent the cam shaft 169 from turning in a clockwise direction when the spring motor 173 is wound up in a clockwise direction (see arrow A in FIG. 7). Once the motor has been wound, it unwinds in a counterclockwise direction causing the shaft 169 to rotate in the direction of the arrow B in FIG. 7. Two cam assemblies 174 and 175 are shown mounted on the shaft to rotate therewith and in their proper sequence actuate the mechanical pilot valves 176 and 177.

Each pilot valve includes a cylindrical housing 178 for the valve stem 71, which housing has an enlarged flared portion 179 terminating in a peripheral edge 181 which contacts the peripheral bead or edge on the pilot diaphragm 65 to aid in sealing the diaphragm in the fitting 63 or 122. This flared portion 179 extends through a suitable opening in the base 168 and in the pilot diaphragm valve plate 47, if a separate plate is utilized. The valve stem 71 has a centrally positioned rod or pin 182 mounted at one end in a piston 183 slidably received within a central opening in the valve stem and abutting one end of a compression spring 184 contained in the opening.

The opposite end of the rod 182 extends upwardly, as seen in FIG. 7, through the closed end of housing 178 and through a plate 185 to abut a pivoted cam follower 186 mounted on a shaft 187. The pin has a flange 188 secured thereto which is normally adjacent to and contacting the plate 185. The plate 185 is urged upwardly into contact with a pair of spaced cam followers 189 which are also pivoted on the shaft 187; the plate being urged upwardly by a compression spring 191 surrounding the housing 178 and having one end engaging the plate 185 and the opposite end engaging the flared portion 179 of the housing.

The cam assemblies 174 and 175 each include an inner cam 192 and a pair of spaced outer cams 193 separated by suitable spacing means 194. The cams 193 are fixed to the cam shaft 169 and the cam 192 can be adjusted relative to the cams 193 by use of suitable means such as bolts 195.

As seen in FIG. 8, the cams 193 have a dropoff point 196 and a cam rise portion 197 while the cam 192 has a spaced cam rise portion 198 and a dropoff point 199. To provide a simultaneous dropoff point for both cam followers 186 and 189, the follower 186 as seen in FIG. 7 contacts both the cam 192 and the spacer members 194. Each spacer member has a dropoff point identical with the point 196 of the cams 193 but the peripheral edge of the spacers remains at the smaller diameter as at 201 until substantially after the maximum spacing between the cam rise portion 197 and the cam rise portion 198. The slots 202 in the cam 192 provide for the bolts 195 to give relative adjustability with the cams 193.

In operation, when a regeneration cycle is required for the tank 10, the timer motor 173 is wound up to initiate counterclockwise rotation of the cam shaft 169 and the cam assemblies 174 and 175. The cam assembly 175 actuating the mechanical pilot valve 177 will initially actuate the directional control valve 14 by reaching the dropoff point 196 so that the cam followers 186 and 189 will simultaneously drop off and the spring 191 will urge the plate 185, flange 188 and rod 182 upwardly to open the valve stem 71 of the pilot valve fitting 63 and begin the brine rinse period of the regeneration. As the regeneration progresses, the cams 193 will reach the cam rise portions 197 to pivot the cam followers 189 outwardly and urge the plate 185 against the spring 191 to compress the spring; the plate 185 moving relative to the rod 182 connected to the valve stem 71. Then at the end of the regeneration period, the cam follower 186 is urged outwardly by the cam rise portion 198 of the cam 192 to close the valve stem 71.

Thus, the spring 191 is compressed prior to closure movement of the valve stem, and it is in this manner, by dividing the closing operation into two parts, that the torque requirement on the spring-wound motor is substantially reduced and sufficient safety factor and reliability is provided. As rotation of the cam shaft 169 continues, the cam assembly 174 operates the pilot valve 176 for the timed refill of the brine tank during the initial portion of the next service cycle; the operation of the pilot valve 176 occurring in the same manner as previously described for the valve 177. Then all cams return to their starting position due to the unwinding of the motor 173. Although a spring-wound timer 173 is shown for the timer assembly 13, other suitable mechanisms may be utilized. One such arrangement contemplated for this assembly uses an electric motor with the cams and mechanical valves. Also solenoid-actuated pilot valves and an electrical timer may be utilized to actuate the valve stems and the pilot diaphragms.

While the improvements have been shown and described as being advantageously applicable to a two-step directional control valve, it is not our desire or intent to unnecessarily limit the scope or the utility of the improved features by virtue of this illustrative embodiment.

We claim:

1. A cartridge unit adapted to be inserted in a generally cylindrical housing comprising: a seat ring having a radially outwardly extending flange at its upper end and a radially inwardly extending flange at its lower end; a central chamber extending through said seat ring; a valve seat formed in said inwardly extending flange; a generally cylindrical ring retainer adapted to be secured onto the outwardly extending flange of the seat ring, said ring retainer having radially outwardly extending flanges at its upper and lower ends forming an annular channel therebetween; a central chamber extending through said retainer ring; a lower diaphragm having its outer periphery clamped between said seat ring and said retainer ring; a two-part valve mounted for reciprocation in said central chambers, the inner edge of said diaphragm being secured to said two-part valve; an enlarged valve member on the lower end of the two-part valve at the exterior of said seat ring and normally engaging said valve seat; and a spaced upper diaphragm having its outer periphery received in the upper edge of said retainer ring, said seat ring and said retainer ring having radial passages from their respective central chambers to the exterior thereof.

2. A cartridge unit as set forth in claim 1, in which a diaphragm support is mounted on said two-part valve adjacent the upper edge of the retainer ring and supports the upper diaphragm.

3. A cartridge unit as set forth in claim 2, in which said two-part valve includes a plunger body terminating at its lower end in said enlarged valve member and having a central longitudinal passage therethrough, said lower diaphragm being secured to said plunger body, and a valve stem positioned in the passage in said plunger body and terminating at its lower end in a conical valve, said valve stem being secured at its upper end to said diaphragm support.

4. A cartridge unit as set forth in claim 3, in which said valve stem has a plurality of equally spaced radial fins located centrally of the ends to provide for uninterrupted flow through the passage in the plunger body and to guide the valve stem in its reciprocatory movement relative to said plunger body, and a helical spring in said upper chamber and having its upper end abutting said diaphragm support and its lower end abutting said plunger body.

5. A cartridge unit adapted to be inserted in a valve housing, comprising: a stepped cylindrical cartridge body, sealing rings in the housing, said body having annular shoulders adjacent the upper and lower ends thereof adapted to engage the sealing rings; a two-part valve mounted for reciprocation in said body with the valve extending below the body, said valve including a hollow plunger terminating in an enlarged lower end and a valve stem positioned within the plunger and terminating in a conical head and forming an annular passage therebetween; a valve seat formed at the lower end of the body for the plunger, said enlarged lower end of the plunger forming a valve seat for the conical head; spaced upper and lower diaphragms in said body; means to clamp the lower diaphragm in said body; separate retaining means securing the lower diaphragm to the plunger; and means receiving the outer periphery of the upper diaphragm in the upper edge of said body, the upper end of said valve stem being secured to the upper diaphragm, said diaphragms forming an upper chamber therebetween in said body and a lower chamber in the body below the lower diaphragm and above the first mentioned valve seat, said body having radial openings communicating with each chamber and with the exterior of the body.

6. A cartridge unit as set forth in claim 5, in which annular chambers are formed between the exterior surface of the body and the interior surface of the housing and communicate with the upper and lower chambers within the body through said radial openings.

7. A directional control valve assembly comprising: a valve housing having an inlet, an outlet, and a pilot valve fitting; a central chamber in said housing and a cartridge unit adapted to be inserted in the central chamber in said housing and having a shoulder; a lower shoulder in said chamber contacting the lower edge of the cartridge unit; an upper shoulder contacting the shoulder on said cartridge and an upper edge; sealing means on said lower and upper shoulders and said upper edge of the housing to seal the cartridge unit therein; a cap adapted to be secured to said housing and compressing the sealing means on the upper edge; a depending cylindrical flange on said cap abutting said cartridge unit, said cartridge unit including spaced upper and lower diaphragms clamped therein; a pressure chamber formed in said cap above said upper diaphragm; a two-part valve mounted for reciprocation in said cartridge unit and terminating in an enlarged valve below the cartridge unit, said two-part valve including a plunger body terminating in said enlarged valve and having a central passage therethrough and a valve stem mounted for reciprocation in said passage and terminating at its lower end in a conical valve adapted to close said passage; a diaphragm support secured to the upper end of said valve stem and adapted to support the upper diaphragm; a valve seat formed on the lower end of the cartridge unit for said enlarged valve; and a valve seat in said housing for said enlarged valve spaced below the valve seat in the cartridge unit.

8. A directional control valve assembly as set forth in claim 7, in which spaced upper and lower annular chambers are formed between the exterior of the cartridge unit and the interior of the housing, a bypass fitting communicating with said lower annular chamber, a drain fitting communicating with said upper annular chamber, and spaced chambers in said cartridge unit communicating with the annular chambers through radially extending passages in said cartridge unit.

9. A directional control valve assembly as set forth in claim 8, in which the pilot valve fitting includes: an outer substantially annular chamber communicating with the lower annular chamber formed between the valve housing and the cartridge unit; a central chamber communicating with the pressure chamber above said upper diaphragm; a pilot diaphragm normally interrupting flow between the substantially annular chamber and the central chamber; a valve stem adapted to actuate said pilot diaphragm; and means to actuate said valve stem.

10. A directional control valve assembly as set forth in claim 7, in which the outer periphery of said upper diaphragm is clamped between said cartridge unit and said depending cylindrical flange, and the outer periphery of said lower diaphragm is clamped in the cartridge unit, and means securing the lower diaphragm to said plunger body.

11. A directional control valve assembly as set forth in claim 10, in which said cartridge unit has an upper chamber between said upper and lower diaphragms communicating with the upper end of said passage in the plunger body and a lower chamber between said lower diaphragm and said first mentioned valve seat, a drain fitting communicating with said upper chamber through radial openings in said cartridge unit, and a bypass fitting communicating with said lower chamber through additional radial openings in said cartridge unit.